United States Patent [19]
Adams

[11] Patent Number: 5,638,261
[45] Date of Patent: Jun. 10, 1997

[54] INTERLOCK SWITCHING SYSTEM AND METHOD

[75] Inventor: Jerry F. Adams, Brockport, N.Y.

[73] Assignee: Xerox Corporation, Stamford, Conn.

[21] Appl. No.: 275,891

[22] Filed: Jul. 15, 1994

[51] Int. Cl.$^6$ .................................................. H02M 3/335
[52] U.S. Cl. .............................. 363/20; 363/56; 363/131
[58] Field of Search .............................. 363/20, 21, 26, 363/41, 55, 56, 95, 97.131; 361/93

[56] References Cited

U.S. PATENT DOCUMENTS

| | | | |
|---|---|---|---|
| Re. 34,396 | 10/1993 | Wollenhaupt | 200/50 R |
| 4,277,659 | 7/1981 | DeRemer | 200/61.62 |
| 4,516,007 | 5/1985 | Ringdahl et al. | 219/10.55 D |
| 4,528,430 | 7/1985 | Lewandowski | 200/61.62 |
| 4,529,852 | 7/1985 | Lewandowski | 200/50 A |
| 4,547,634 | 10/1985 | Leger | 200/50 C |
| 4,659,884 | 4/1987 | Wollenhaupt | 200/50 R |
| 4,675,796 | 6/1987 | Gautherin et al. | 363/20 |
| 4,687,889 | 8/1987 | Leger | 200/61.62 |
| 4,717,794 | 1/1988 | Paul et al. | 200/50 A |
| 4,910,634 | 3/1990 | Pipkorn | 361/147 |
| 4,928,200 | 5/1990 | Redl et al. | 361/93 |
| 4,978,817 | 12/1990 | Honda | 200/50 A |
| 4,982,058 | 1/1991 | Schroeder et al. | 200/61.62 |
| 5,079,689 | 1/1992 | Gidon et al. | 363/131 |
| 5,239,202 | 8/1993 | Hostetler | 307/116 |
| 5,331,532 | 7/1994 | Iwai et al. | 363/20 |
| 5,453,921 | 9/1995 | Shutts | 363/21 |
| 5,488,552 | 1/1996 | Sakamoto et al. | 363/21 |

FOREIGN PATENT DOCUMENTS 2702943  8/1977  Germany .................... 363/20

*Primary Examiner*—Peter S. Wong
*Assistant Examiner*—Adolf Berhane
*Attorney, Agent, or Firm*—Fay, Sharpe, Beall, Fagan, Minnich & McKee

[57] ABSTRACT

An interlock switch (14) is provided between a housekeeping power supply (12) and a pulse width modulator (16). The pulse width modulator (16) pulses a field effect transistor (18) to generate alternating current (AC) to be passed by a transformer (26). The AC is converted to direct current (DC) by a converter 34 to provide an output voltage. If the switch (14) is opened, power to the modulator (16) and transistor (26) is terminated. No AC power is transmitted. Thus, since the transformer (26) only transfers AC, no voltage is generated at the output of the system.

15 Claims, 2 Drawing Sheets

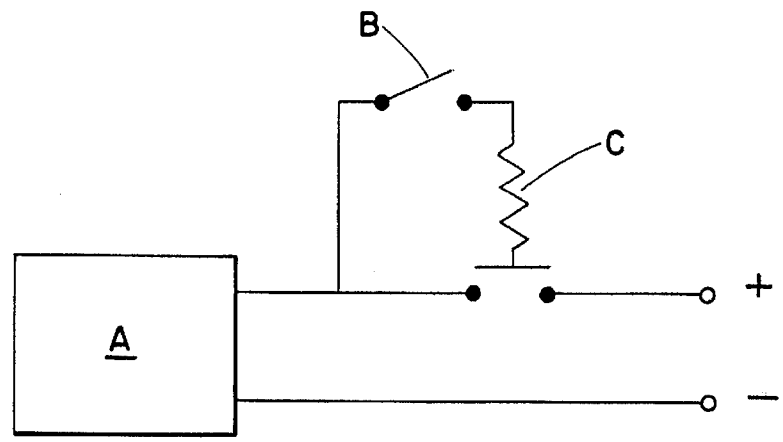
FIG. I
(PRIOR ART)
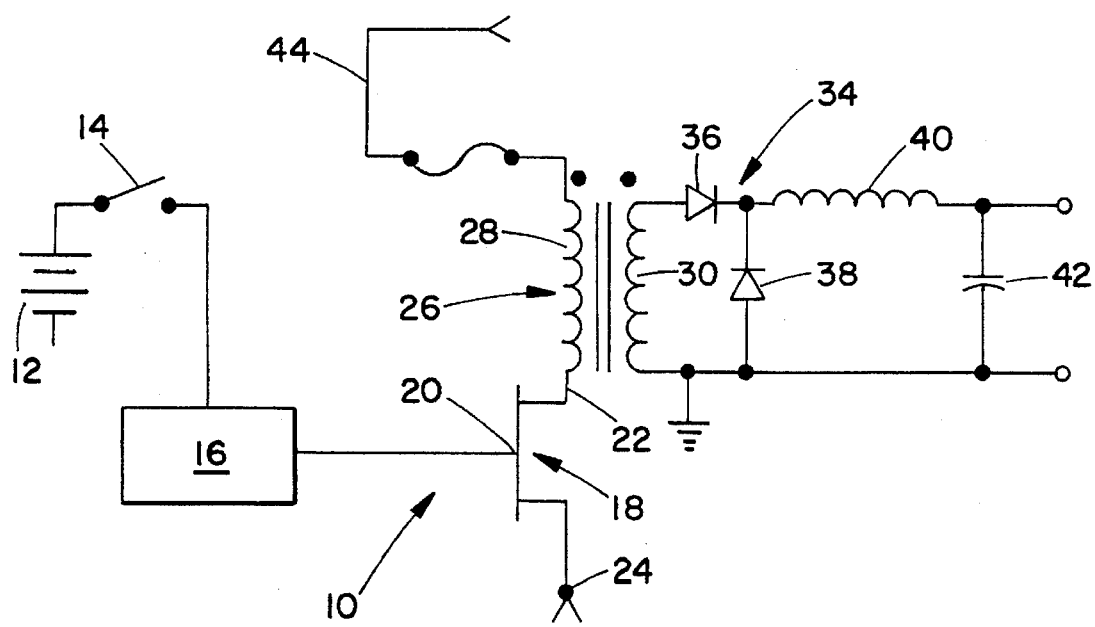
FIG. 2

INTERLOCK SWITCHING SYSTEM AND METHOD

BACKGROUND OF THE INVENTION

This invention relates to a system and/or method for interlocking a power supply in, for example, a printing apparatus such as a copy machine or printer, to prevent user or technician exposure to potentially hazardous direct current (DC) voltages or mechanically hazardous systems which derive their power from such DC voltages. The system is arranged so that an interlock switch connected to the housekeeping power supply of the apparatus and a power transformer, which only transmits alternating current (AC) from its primary side to its secondary side, are used to terminate power to areas of the apparatus which are potentially hazardous to users or technicians. Opening the interlock switch, upon the occurrence of an event such as opening of a copy machine door, ultimately prevents transmission of AC power through the power transformer. Thus, no AC potential is developed on the secondary side of the transformer and, consequently, no DC voltage is developed at the output of the system.

While the invention is particularly directed to the art of interlock switching, and will thus be described with specific reference thereto, it will be appreciated that the invention may have usefulness in other fields and applications where it is desirable to interrupt large amounts of DC power in a fail-safe manner, using only low power switching devices.

International safety organizations typically require that consumer products be designed to protect consumers from any potential hazards of the product, especially electrical hazards. With respect to copy machines and printers, voltages of varying magnitude, corresponding to various parts of each machine, are present in each machine. Certain of these voltages, and related current levels, exceed that which is considered safe. Thus, potential hazards exist for users and technical personnel who maintain and service such machines.

Accordingly, either 1) restricting access to hazardous areas of the machine to only technical personnel, and/or 2) removing potential hazards when an operator gains access to a hazardous area of the machine, have become accepted preventative techniques.

Regarding the former technique, potentially hazardous areas are oftentimes enclosed with a protective insulated cover and secured to prevent access by unauthorized persons. As to the latter technique, the removal of potential hazards has traditionally been accomplished by disconnecting DC power to the source of the potential hazard. Since the systems are unable to develop any hazardous conditions without power, this has proven to be successful. In copy machines, an interlock switch is connected to the door of the machine so that when the door is closed, the switch is closed. Likewise, when the door is opened, the switch is opened to terminate the supply of power creating the potential hazard.

Power is typically disconnected by connecting the interlock switch in such a manner so as to directly interrupt DC power or by operating a power relay, with an interlock switch in the relay coil circuit, which interrupts DC power to the potentially hazardous area or system. FIG. 1 shows an example of the power relay interruption system. More particularly, power supply A, a 24 volt switch mode power supply (SMPS) having a 12–15 volt housekeeping supply included therein, is connected to interlock relay C having interlock switch B in its relay coil circuit. The switch B is in a normally closed position. Upon detection of an undesirable condition, i.e., opening of a door creating the potential for a hazardous condition, the switch B opens. Thus, the relay C is de-energized and power to the output is interrupted.

These traditional systems, however, involve switching high current loads in high stress conditions since the output current load is oftentimes in the range of 15–50 amps. As a result, undesirable noise transients are developed, arcing occurs, switch wear develops, and disturbances are induced on the DC power lines.

The present invention cures the above noted deficiencies and provides an improved interlock switching system.

SUMMARY OF THE INVENTION

The system of the present invention provides a reliable interlock circuit that does not utilize high power relays or switches. The system utilizes the characteristics of transformers that allow only the transfer of AC power to isolate potentially hazardous DC voltage conditions upon opening of the interlock switch.

In one aspect of the invention, an interlock switch is provided between a DC power supply and a pulse width modulator (PWM), power from the supply being provided only when the interlock switch is closed.

In another aspect of the invention, a field effect transistor (FET) is connected to the PWM so that the PWM, when powered by the supply, switches the FET on and off to generate AC.

In still another aspect of the invention, a transformer is connected to the FET to transmit the AC from its primary side to its secondary side when the AC is produced as a result of the interlock switch being closed.

In still yet another aspect of the invention, a converter is provided to convert the AC to DC to generate a DC output voltage.

An advantage of the present development is that potentially hazardous voltages are isolated from a user or technician if the interlock switch is opened, e.g., when the door of a copy machine is opened. More specifically, when the door is opened, the interlock switch is opened and power to the PWM is cut off. Consequently, the PWM does not pulse the FET on and off, AC is not produced to be transmitted by the transformer, and no output voltage is realized.

A further advantage of the present development is that the interlock switch is connected to the housekeeping power supply which typically develops only 12–15 volts, and provides only 100 milliamperes of DC current to the PWM. Thus, the switch operates in a low power, low stress environment, resulting in reduction and/or prevention of noise transients, excess wear, arcing, and line disturbances. Moreover, the switch is inexpensive.

A still further advantage of the present development is that the action of opening and closing the interlock switch causes the PWM to behave in a manner consistent with normal application and removal of AC power. Thus, measures routinely employed to limit inrush current and softer switch transients are equally effective in further reducing stress, wear, transients, etc. under these conditions.

Further advantages and scope of the applicability of the present invention will become apparent from the detailed description provided below. It should be understood, however, that the detailed description of specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination, of the various parts of the device, whereby the objects contemplated are attained as hereinafter more fully set forth, specifically pointed out in the claims, and illustrated in the accompanying drawings in which:

FIG. 1 is a schematic drawing of a prior art circuit;

FIG. 2 is a schematic representation of the interlock switching system of the present invention; and, FIG. 3 is a schematic representation of an alternative embodiment of the system of FIG. 2.

DETAILED DESCRIPTION OF THE PREFERRED EMBODIMENT

Figure 3:
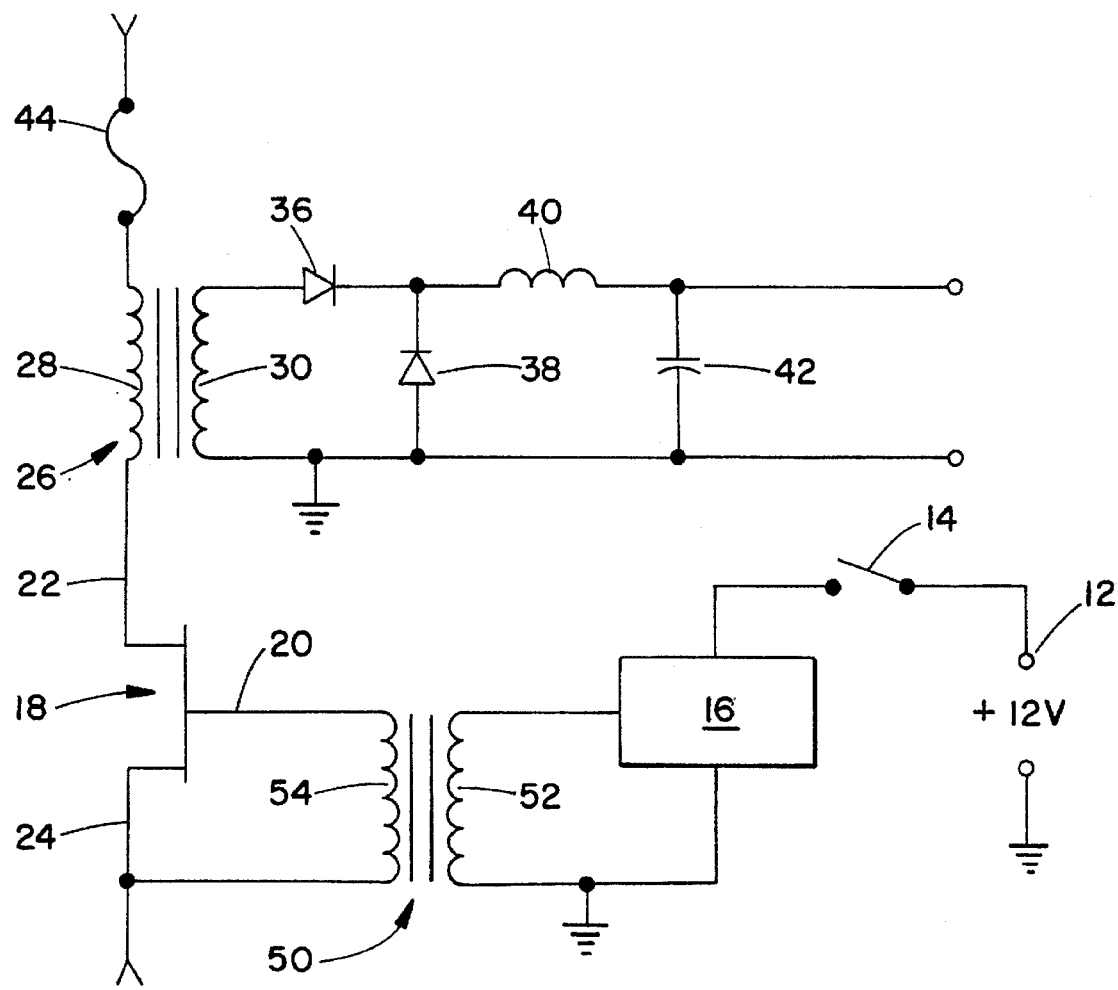

Referring now to the drawings wherein the showings are for purposes of illustrating the preferred embodiments of the invention only and not for purposes of limiting same, FIG. 2 provides a view of a preferred embodiment. As shown, the interlock switching system 10 is comprised of a housekeeping power supply 12, an interlock switch 14, a pulse width modulator (PWM) 16, a field effect transistor (FET) 18, a power transformer 26, AC-to-DC converter 34, and rectified AC line 44.

The housekeeping power supply 12 is included in a switch mode power supply (SMPS), not shown, of approximately 24 volts DC and 15–50 amps load current. The housekeeping power supply operates in the range of 12–15 volts and 100 milliamps.

The interlock switch 14 is preferably a low power, low stress switch since the housekeeping power supply 12 only generates 12–15 volts. Moreover, the switch 14 is located so as to open when the door of a copy machine is opened. It is recognized that the switch may be suitably arranged on a printer or the like to open when access to potentially hazardous areas is attempted.

The PWM 16 is a preferred mechanism to produce electrical pulse stimuli. However, any alternative pulse generating mechanism, such as an astable multivibrator, resonant mode SMPS controller or other SMPS controller may also be used.

The FET 18 includes a gate 20, drain 22, and source 24. It is appreciated that any type of transistor, or other switching mechanism such as a bipolar transistor, SCR, IGBT, etc., may suitably be used in place of the FET 18 if equivalent results can be obtained.

The power transformer 26 includes primary winding, or side, 28 and secondary winding, or side 30 and is powered by rectified AC line 44. While line 44 has the potential to provide AC power to the primary side 28 under certain fault conditions, such power is minimal and is not transmitted to the secondary side 30 since the line frequency is of a value too low to allow passage through the transformer 26. Under normal conditions rectified AC line 44 is held at a DC voltage.

Additionally, the AC-to-DC converter 34 includes diodes 36 and 38, inductor 40, and capacitor 42. A comparable AC-to-DC converter may also be used, as will be appreciated by those skilled in the field.

With respect to arrangement of the components, the interlock switch 14 has a terminal connected to the power supply 12 and a terminal connected to the PWM 16, the output of which connects to the gate 20 of the FET 18. The source 24 of the FET 18 is grounded while the drain 22 is connected to primary winding 28 of power transformer 26. The AC-to-DC converter is suitably connected to the secondary winding 30 of the power transformer 26.

In operation, when the interlock switch 14 is opened, power from the housekeeping power supply 12 is interrupted to the PWM 16. Interrupting the supply of such power renders the system 10 incapable of outputting any DC power.

More particularly, under uninterrupted operation, when the interlock switch 14 is closed, power supply 12 supplies DC power to PWM 16. PWM 16 in turn generates electrical stimulus pulses, communicates such pulses to the FET 18, and drives the FET gate 20 to selectively turn the FET 18 on and off to generate AC current. The AC current is then transferred from the primary side 28 of transformer 26 to the secondary side 30 of the transformer 26 where it is converted back to DC voltage, as those skilled in the art will appreciate, by converter 34 and output.

If interlock switch 14 is opened, by, for example, opening the door of a copy machine, the housekeeping power supply 12 is effectively isolated from the system. As a result, the FET 18 is not driven by the PWM 16, i.e., placed in a non-conductive state between its drain 22 and source 24, and, therefore, no AC voltage is supplied to the primary winding 28 of transformer 26 by FET 18. Accordingly, no AC secondary voltage on winding 30 of transformer 26 is generated and, consequently, no DC output voltage is present at the output of the system 10.

A significant advantage of the interlock switching system 10 of the present application is that no high power switches or relays are required. The system is compatible with normal start up sequencing. Further, noise is kept low, switch bounce is limited and the interlock switch is used in a low stress mode. Thus, switch contacts and/or relays are not prone to stress induced early wearout failures, such as welded contacts.

Additionally, the transformer 26 provides isolation of the DC output from the power supply 12. Accordingly, safety extra low voltage (SELV) components may be utilized between the transformer 26 and the output. SELV is a component classification for components that present no shock hazard to consumers. SELV devices must operate below 45 volts and be isolated from non-SELV devices.

The present invention provides safety features for interlock systems so that virtually any failure causes the power supply to go to a safe condition. Specifically, in the case of a safety interlocked power supply, no voltage at all is generated at the output when the interlock switch is open. No single or multiple component failure, other than a short circuit in the actual interlock switch, will allow voltage to be present at the output of the supply when the interlock switch is open.

FIG. 3 illustrates an alternative embodiment of the present invention. As will be appreciated by those skilled in the art, while the embodiment described in connection with FIG. 2 is particularly adaptable to SMPS's employing primary side control, most often single output systems, wherein the housekeeping power source and PWM are more economically placed on the primary side of transformer 26, the embodiment to be hereafter described finds advantageous application in SMPS's employing secondary side control, most often multiple output systems, wherein the PWM is connected to the secondary side of transformer 26 through a common ground and one of the multiple output voltages is utilized as the housekeeping source for one or more of the other PWMs needed to generate additional DC outputs.

As shown, the system 10 is similar to the embodiment described in connection with FIG. 2. In this regard, like numerals designate like components. However, an additional transformer 50 is connected between the PWM 16 and the FET 18. Specifically, the primary side 52 is connected to the PWM 16 and the secondary side 54 is connected to the gate 20 of FET 18.

A housekeeping supply 12 is shown. However, the housekeeping supply 12 may in fact be another, non-interlocked output in a multiple output system rather than a power supply specifically included for housekeeping.

In operation, the opening of switch 14 terminates the supply of power to the PWM 16 and, consequently, no AC power is generated for transmission through transformer 50 to the gate 20 of the FET 18. Since no AC is transmitted, the FET 18 is not activated to produce AC, no power is transferred through transformer 26 and no output power is developed.

Significantly, since the power supply 12 is isolated by transformer 50, all components between the transformer 50 and the output are preferably SELV type. This increases safety and reduces cost. Additionally, the above described circuit maintains all advantages claimed in relationship to the circuit of FIG. 2.

The above description merely provides a disclosure of particular embodiments of the invention and is not intended for the purpose of limiting the same thereto. As such, the invention is not limited to only the above described embodiments. Rather, it is recognized that one skilled in the art could conceive alternative embodiments that fall within the spirit and scope of the invention.

Having thus described the invention, I claim:

1. An interlock circuit comprising:

a power supply generating power;

a pulse width modulator generating electrical stimulus pulses at an output thereof;

an interlock switch connecting the power supply to an input of the pulse width modulator, the power being supplied to and enabling the pulse width modulator only when the interlock switch is closed;

a field effect transistor having a gate, a drain and a source, the gate being connected to the output of the pulse width modulator and the source being connected to ground, the transistor selectively being one of sequentially switched on and off, in accordance with the pulses of the pulse width modulator when the interlock switch is closed to provide alternating current to the drain, and switched off when the interlock switch is open;

a transformer connected to the drain of the field effect transistor at a primary side thereof for transmitting the alternating current to a secondary side thereof;

a converter connected to the secondary side of the transformer converting the alternating current to direct current; and, output terminals connected to the converter provided to output an output voltage generated in connection with the direct current.

2. The circuit of claim 1 further comprising a second transformer functionally disposed between the pulse width modulator and the transistor.

3. The circuit of claim 2 wherein a primary side of the second transformer is connected to the output of the pulse width modulator and a secondary side of the second transformer is connected to the gate of the transistor.

4. An interlock circuit comprising:

a power supply generating power;

a pulse generator generating electrical stimulus pulses at an output thereof;

a first interlock switch connecting the power supply to an input of the pulse generator, the power being supplied to and enabling the pulse generator only when the first switch is closed;

a second switch selectively being one of sequentially switched on and off, in accordance with the pulses of the pulse generator when the first switch is closed to generate alternating current, and switched off when the first switch is open;

a transformer connected to the second switch at a primary side thereof for transmitting the alternating current to a secondary side thereof;

a converter connected to the secondary side of the transformer converting the alternating current to direct current; and, output terminals connected to the converter provided to output an output voltage generated in connection with the direct current.

5. The circuit of claim 4 further comprising a second transformer connected between the pulse generator and the second switch.

6. The circuit of claim 5 wherein a primary side of the second transformer is connected to the output of the pulse generator and a secondary side of the second transformer is connected to the second switch.

7. An interlock circuit comprising:

a power supply generating power;

a pulse width modulator generating electrical stimulus pulses at an output thereof;

an interlock switch connecting the power supply to an input of the pulse width modulator, the power being supplied to and enabling the pulse width modulator only when the interlock switch is closed;

a first transformer having a primary side connected to the output of the pulse width modulator;

a field effect transistor having a gate, a drain and a source, the gate being connected to a secondary side of the first transformer and the source being connected to ground, the transistor selectively being one of sequentially switched on and off, in accordance with the pulses of the pulse width modulator when the interlock switch is closed to provide alternating current to the drain, and switched off when the interlock switch is open;

a second transformer connected to the drain of the field effect transistor at a primary side thereof for transmitting the alternating current to a secondary side thereof;

a converter connected to the secondary side of the second transformer converting the alternating current to direct current; and, output terminals connected to the converter provided to output an output voltage generated in connection with the direct current.

8. A printing apparatus comprising:

a power supply generating power;

a pulse width modulator generating electrical stimulus pulses at an output thereof;

an interlock switch responsive to opening and closing of a door of the printing apparatus connecting the power supply to an input of the pulse width modulator, the power being supplied to and enabling the pulse width modulator only when the interlock switch is closed;

a field effect transistor having a gate, a drain and a source, the gate being connected to the output of the pulse width modulator and the source being connected to ground, the transistor selectively being one of sequentially switched on and off, in accordance with the pulses of the pulse width modulator when the interlock switch is closed to provide alternating current to the drain, and switched off when the interlock switch is open;

a transformer connected to the drain of the field effect transistor at a primary side thereof for transmitting the alternating current to a secondary side thereof;

a converter connected to the secondary side of the transformer converting the alternating current to direct current; and, output terminals connected to the converter provided to output an output voltage generated in connection with the direct current.

9. The apparatus of claim 8 further comprising a second transformer connected between the pulse width modulator and the transistor.

10. The apparatus of claim 9 wherein a primary side of the second transformer is connected to the output of the pulse width modulator and a secondary side of the second transformer is connected to the gate of the transistor.

11. A printing apparatus comprising:

a power supply generating power;

a pulse generator generating electrical stimulus pulses at an output thereof;

a first switch responsive to opening and closing of a door of the printing apparatus connecting the power supply to an input of the pulse generator, the power being supplied to and enabling the pulse generator only when the first switch is closed;

a second switch selectively being one of sequentially switched on and off, in accordance with the pulses of the pulse generator when the first switch is closed to generate alternating current, and switched off when the first switch is open;

a transformer connected to the second switch at a primary side thereof for transmitting the alternating current to a secondary side thereof;

a converter connected to the secondary side of the transformer converting the alternating current to direct current; and, output terminals connected to the converter provided to output an output voltage generated in connection with the direct current.

12. The apparatus of claim 11 further comprising a second transformer connected between the pulse generator and the second switch.

13. The apparatus of claim 12 wherein a primary side of the second transformer is connected to the output of the pulse generator and a secondary side of the second transformer is connected to the second switch.

14. A method of selective power isolation in a printing apparatus, the method comprising steps of:

receiving electric power from an associated power supply;

generating electrical stimulus pulses in a pulse width modulator;

selectively supplying power received from the associated power supply to the pulse width modulator in accordance with one of an open position and closed position of an associated interlock switch, the interlock switch being responsive to opening and closing of a door of the printing apparatus;

communicating the electrical stimulus pulses to a gate of a field effect transistor, a source of which is connected to ground;

selectively switching the field effect transistor in accordance with the electrical stimulus pulses to generate alternating current when the associated interlock switch is in the closed position;

transferring the alternating current through a transformer;

converting the transferred alternating current to direct current; and, switching the field effect transistor into a non-conductive state between its source and drain when the associated interlock switch is in an open position.

15. A power isolation circuit adapted for use in a printing apparatus, the circuit comprising:

means for receiving electric power from an associated power supply;

means for generating electrical stimulus pulses in a pulse width modulator;

means for selectively supplying power received from the associated power supply to the pulse width modulator in accordance with one of an open position and closed position of an associated interlock switch, the interlock switch being responsive to opening and closing of a door of the printing apparatus;

means for communicating the electrical stimulus pulses to a gate of a field effect transistor, a source of which is connected to ground;

means for selectively switching the field effect transistor in accordance with the electrical stimulus pulses to generate alternating current when the associated interlock switch is in the closed position;

means for transferring the alternating current through a transformer;

means for converting the transferred alternating current to direct current; and, means for switching the field effect transistor into a non-conductive state between its source and drain when the associated interlock switch is in an open position.

* * * * *